(12) United States Patent
Dohnal et al.

(10) Patent No.: US 6,529,858 B1
(45) Date of Patent: Mar. 4, 2003

(54) METHOD OF CONTROLLING STEP SWITCHES

(75) Inventors: Dieter Dohnal, Lappersdorf (DE); Karsten Viereck, Diesenbach (DE); Mario Schmeckebier, Regensburg (DE)

(73) Assignee: Maschinenfabrik Reinhausen GmbH, Regensburg (DE)

(*) Notice: Subject to any disclaimer, the term of this patent is extended or adjusted under 35 U.S.C. 154(b) by 0 days.

(21) Appl. No.: 09/914,189

(22) PCT Filed: Jan. 11, 2000

(86) PCT No.: PCT/EP00/00111

§ 371 (c)(1),
(2), (4) Date: Aug. 23, 2001

(87) PCT Pub. No.: WO00/50910

PCT Pub. Date: Aug. 31, 2000

(30) Foreign Application Priority Data

Feb. 24, 1999 (DE) .......................... 199 07 834

(51) Int. Cl.⁷ .............................. G05F 4/147
(52) U.S. Cl. .................... 702/188; 324/772; 323/256; 323/341
(58) Field of Search ................. 702/188, 57, 58; 324/547, 421, 736, 424, 772, 341; 323/340, 341, 256, 255

(56) References Cited

U.S. PATENT DOCUMENTS

| | | | | |
|---|---|---|---|---|
| 5,550,459 A | * | 8/1996 | Laplace | 323/255 |
| 6,100,674 A | * | 8/2000 | Dohnal et al. | 323/256 |
| 6,124,726 A | * | 9/2000 | Dohnal et al. | 323/341 |

FOREIGN PATENT DOCUMENTS

| | | |
|---|---|---|
| DE | 197 46 574 C | 2/1999 |
| JP | 60 176 213 | 9/1985 |
| JP | 09 213 542 | 8/1997 |

* cited by examiner

Primary Examiner—John S. Hilten
Assistant Examiner—Hien Vo
(74) Attorney, Agent, or Firm—Herbert Dubno

(57) ABSTRACT

A method of controlling a step switch. From the measured values of current, voltage and phase angle at an electric drive motor during actuation of the step switch the individual picked-up active output is calculated. From the active output the corresponding torque at the drive motor is calculated. The torque in the step switch which is crucial for controlling is determined on the basis of the torque by using a specifically calculated transfer function. The transfer function is newly determined every time the switch is actuated, with the values of the preceding switch operation or the preceding switch operations being taken as a basis of the new calculation.

6 Claims, 5 Drawing Sheets

METHOD OF CONTROLLING STEP SWITCHES

CROSS REFERENCE TO RELATED APPLICATIONS

This application is a national stage of PCT/EP00/0011 filed Jan. 11, 2000 and based upon German National application 199 07 834.3 of Feb. 24, 1999 under the International Convention.

FIELD OF THE INVENTION

The invention relates to a method of monitoring tap changers.

BACKGROUND OF THE INVENTION

The Japanese Patent Publication Sho-60-176213, laid open on Sep. 10, 1985, describes a tap changer with a motor drive for actuating same. The motor drive and the driven tap changer are thus connected with one another by a drive shaft train. For monitoring the orderly function of the tap changer, with each selection of the tap, the instantaneous torque on the drive shaft is ascertained and is compared, as an actual value, with a setpoint value which is determined by a respective previously determined switch-specific torque. Upon deviations which exceed a certain threshold, a defect alert is generated.

The Japanese Patent Publication Sho-62-172240, laid open on Nov. 11, 1987, also relates to such a monitoring method based upon which a monitoring of the torque at the drive shaft is carried out and describes a torque detection unit which is arranged directly on the drive shaft, which measures the torque in a direct mechanical manner and which converts the torque into an electrical value and thereafter compares the electrical value with corresponding setpoint.

From the presentation of Professor Gorgius "Technical Diagnostics on Tap Changers For Large Power Transformers" at the "8th International IMEKO Symposium on Technical Diagnostics" and the Symposium Papers published in relation thereto, such a method is also already known in which the mechanical torque at the drive shaft is determined in an indirect manner by measurement of the power which is required for the drive motor. By known measuring devices, current and voltage converters, current converters, voltage and cos $\phi$ at the drive motor are measured and the power Pw is calculated. From the respective specific motor characteristics $M_d = f(Pw)$, the torque can be calculated.

This indirect determination of the torque of the drive shaft provides an elegant and relatively simple solution. On the one hand, it avoids the need for torque measuring hubs or other mechanical measuring means on the drive shaft, and on the other hand, it eliminates the otherwise required conversion of the measured mechanical parameter into an electrical parameter better suited for the subsequent actual-value/setpoint comparison. In spite of these advantages, monitoring of tap changes by a torque comparison, based upon the power demand of the drive motor has up to now not been practiced. The main reason for this is that a calculator-determined torque more accurately represents the torque of the drive motor or, stated more accurately the torque at the end of the drive shaft which is connected to the drive train for operating the tap changer. What should be monitored, therefore, is not the torque at this location but more properly the torque at the other end of this drive train, namely, at the tap changer.

In FIG. 1 this relationship has been shown schematically: In a transformer tank T, a tap changer OLTC is recessed. Laterally of the transformer tank T, a motor drive MA is disposed, from which a drive shaft train W1, W2, W3 runs to the tap changer OLTC. With the process described above the torque MPw is obtained at the location 1 at which is found the drive motor for the motor drive. Instead, the relevant torque is a torque MSt arising at the location 2 which is within the tap changer. What is the difficulty is that there is no constant mathematical relationship between the calculated torque MPw and the real torque in the tap changer MSt. Rather the relationship varies as a result of temperature effects, aging and wear characteristics of the mechanism of the tap changer, the bearing locations and other effects during the whole life of the tap changer which as a rule can extend over many years.

There is thus no stable, i.e. constant, transfer relationship between the drive motor of the motor drive and the tap changer driven based upon the time-course of the torque.

OBJECT OF THE INVENTION

The object of the invention is, therefore, to provide a method for the purposes described which effects with each switching a calibration, i.e. a new calculation of the relationship between MPw and MSt and thus of the transfer function which allows the determination of the instantaneous real torque independently from the mentioned influencing factors to enable an effective monitoring and to provide a more effective setpoint/actual value comparison.

SUMMARY OF THE INVENTION

This object is achieved with a method of monitoring a tap changer whereby during the actuation of the tap changer, i.e. during the switchover process, current, voltage and phase angle of an electric drive motor of a motor drive provided for actuating the tap changer are substantially continuously measured. From these measured values the respective actual power draw of the drive motor is calculated. From the calculated power draw and based upon the specific motor characteristic the effective torque associated therewith is calculated.

With each switching process (x=1,2,3, . . . ) of the tap changer from the magnitudes of the calculated values for the torque at the drive motor ($M_xPw1$ . . . $MP_xP8$) the characteristic values at two previously established time points ($t_A$, $t_B$) which are the same for each switchover process are selected for the torque at the drive motor ($M_xPwA$, $M_xPwB$) and stored.

From the magnitudes of the calculated values for the torque at the drive motor ($M_xPw1$ . . . $M_xPw8$) the corresponding values for the torque at the tap changer ($M_xSt1$ . . . $M_xSt8$) are calculated in accordance with the relationship $$M_xSt1 = M_xPw1 \cdot m_x + n_x, \ldots, M_xSt8 = M_xPw8 \cdot m_x + n_x,$$

and these calculated values are monitored and compared with previously established threshold values, whereby the values for $m_x$ and $n_x$ are calculated for the torque at the drive motor ($M_{x-1}PwA, M_{x-1}PwB$) on the one hand and at the tap changer ($M_{x-1}StA, M_{x-1}StB$) on the other hand each at the respective one of the two time points ($t_A, t_B$) according to the relationships $$M_x = \frac{M_{x-1}StB - M_{x-1}StA}{M_{x-1}PwB - M_{x-1}PwA}$$

From the magnitudes of these calculated values for the torque at the tap changer ($M_x$St1 ... $M_x$ St8) the characteristic values at the two previously established time points ($t_A$, $t_B$) for the torque at the tap changer ($M_x$ StA, $M_x$ StB) are also selected and stored. After each switchover process, the characteristic values for the previous switching (x−1) for the torque at the drive motor ($M_{x-1}$PwA, $M_{x-1}$PwB) and at the tap changer ($M_{x-1}$StA, $M_{x-1}$StB) are overwritten by the corresponding values of the immediately concluded subsequent switching (x). Prior to the first time switch operation (x=1), i.e. in the unactuated new state of the tap switch or after it has been reset, the corresponding values for $m_1$ and $n_1$ are predetermined from an external source. For calculation of $m_x$ an additional memory factor $\lambda$ can be considered which is less than 1 and from which a corrected value $m_x$ is obtained in accordance with the relationship $m'_x = \lambda \cdot m_{x-1} + (1-\lambda) \cdot m_x$.

Each calculation of $m_x$ is compared with the value $m_{x-1}$ obtained and stored in the preceding switch operation and when $m_x < 0$ or $m_x > m_{x-1} + a$, where a is predetermined constant, $m_x = m_{x-1}$ is valid, i.e. no change for this value is effective over the previous last switching (x−1). The values for the torque at the motor ($M_x$Pw1 ... $M_x$PW8) and/or at the tap changer ($M_x$St1 ... $M_x$St8) is subdivided into typical functional regions or time regions, so-called windows, and for each window depending upon a previously developed calculation a typical single value for the corresponding torque is calculated such that the typical values of all windows provide a basis for monitoring the further process.

The advantages of the method according to the invention are that the evaluation of each already completed switching or a plurality of previously effected switching of the tap changer results in an actual matching of the transfer stretch, i.e. of the relationship MSt=f(Mpw). More accurately stated: for the calculation of the torque upon an actual switching of the tap changer, corresponding parameters are obtained from the previous (last) switching to determine the transfer function, etc.

The method of the invention can be made finer however. It is especially advantageous when, in addition, a so-called memory factor is introduced. This memory factor which is incorporated in the respective transfer function and is newly calculated upon the actual switching of the tap changer, utilizes the value for a preceding switching only in part, i.e. the respective actual slope in the transfer function is calculated to provide a newly calculated slope and combined with the slope from the previous switching. This has the considerable advantage that values which are imprecise are utilized only to a reduced extent since they are only involved in part in the calculation step. In an especially advantageous embodiment of the method, plausibility tests are carried out and the effect of an error linked calculation of the increase can thereby be reduced.

BRIEF DESCRIPTION OF THE DRAWING

The method of the invention is described by way of example in greater detail with reference to the drawing: In the drawing.

SPECIFIC DESCRIPTION

Figure 1:
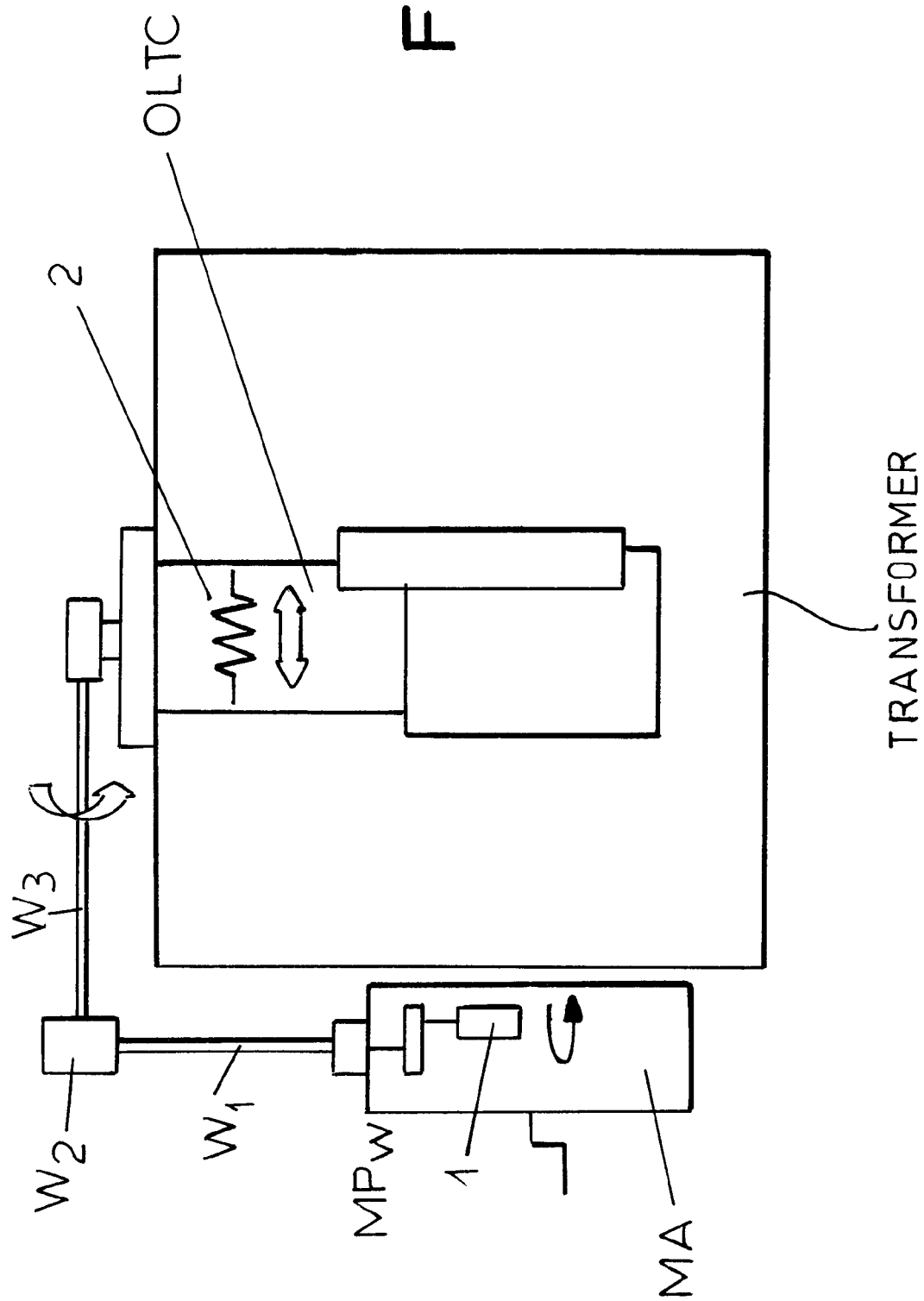
FIG. 1 is a diagram of the already mentioned spatial relationships at a tap changer.

The apparatus principles of the tap changer according to the invention as shown in FIG. 1 and the motor drive for actuating it have already been described. This apparatus is applicable not only to the invention but to all monitoring of tap changers.

Figure 2:
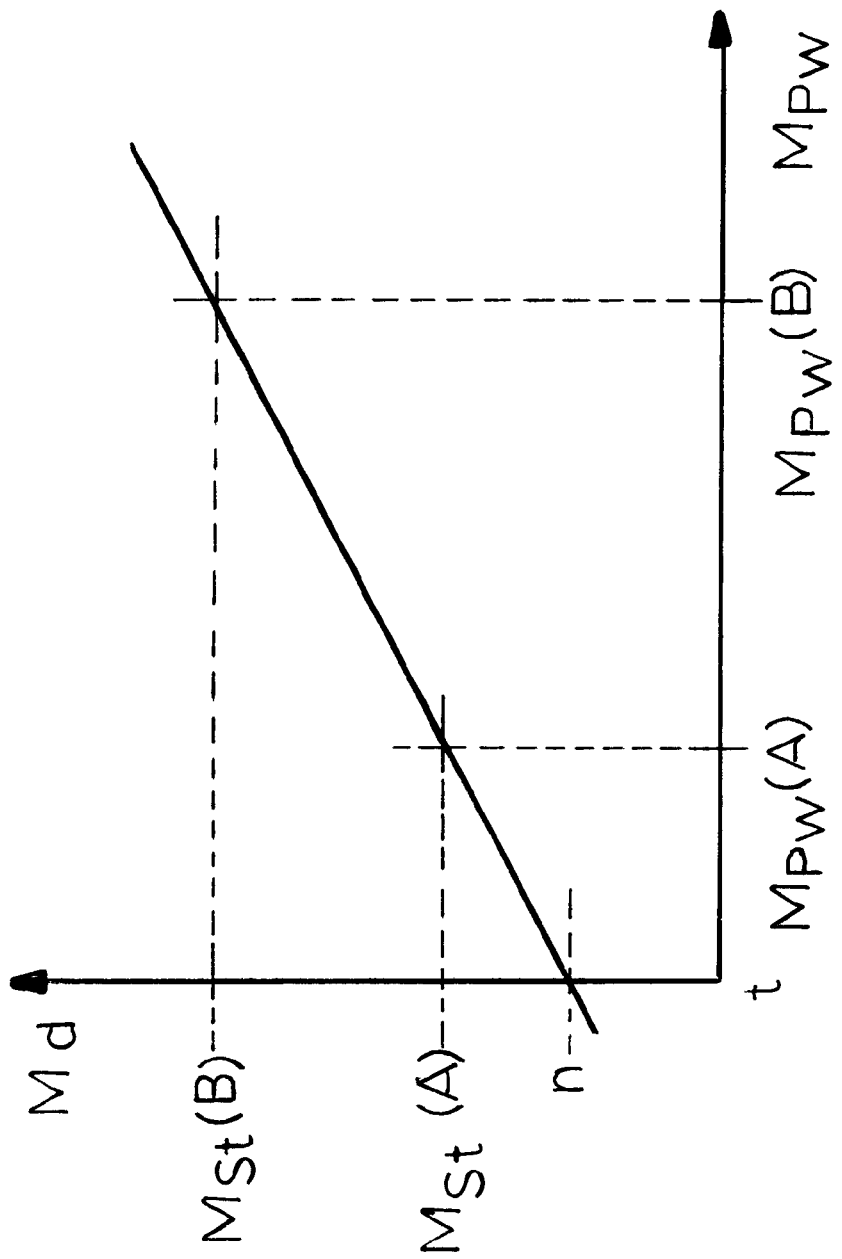
FIG. 2 a graph of a transfer function MSt=f(MP$_w$) as a mathematical model.

FIG. 2 shows the fundamental mathematical relationship between the calculated torque MPw and the corresponding torque at the tap changer MSt as a linear approximation. It gives the slope M and an offset n. The latter is an absolute value by which the values are shifted relative to one another. This value corresponds to the torque which is required to operate the drive train and overcome the friction thereof without actuating the tap changer itself. This relationship MSt=f(MPw), i.e. the transfer function remains unchanged; Both m and n vary during the "life" i.e. the duration of operation of the tap changer, the drive train and the motor drive.

Figure 3:
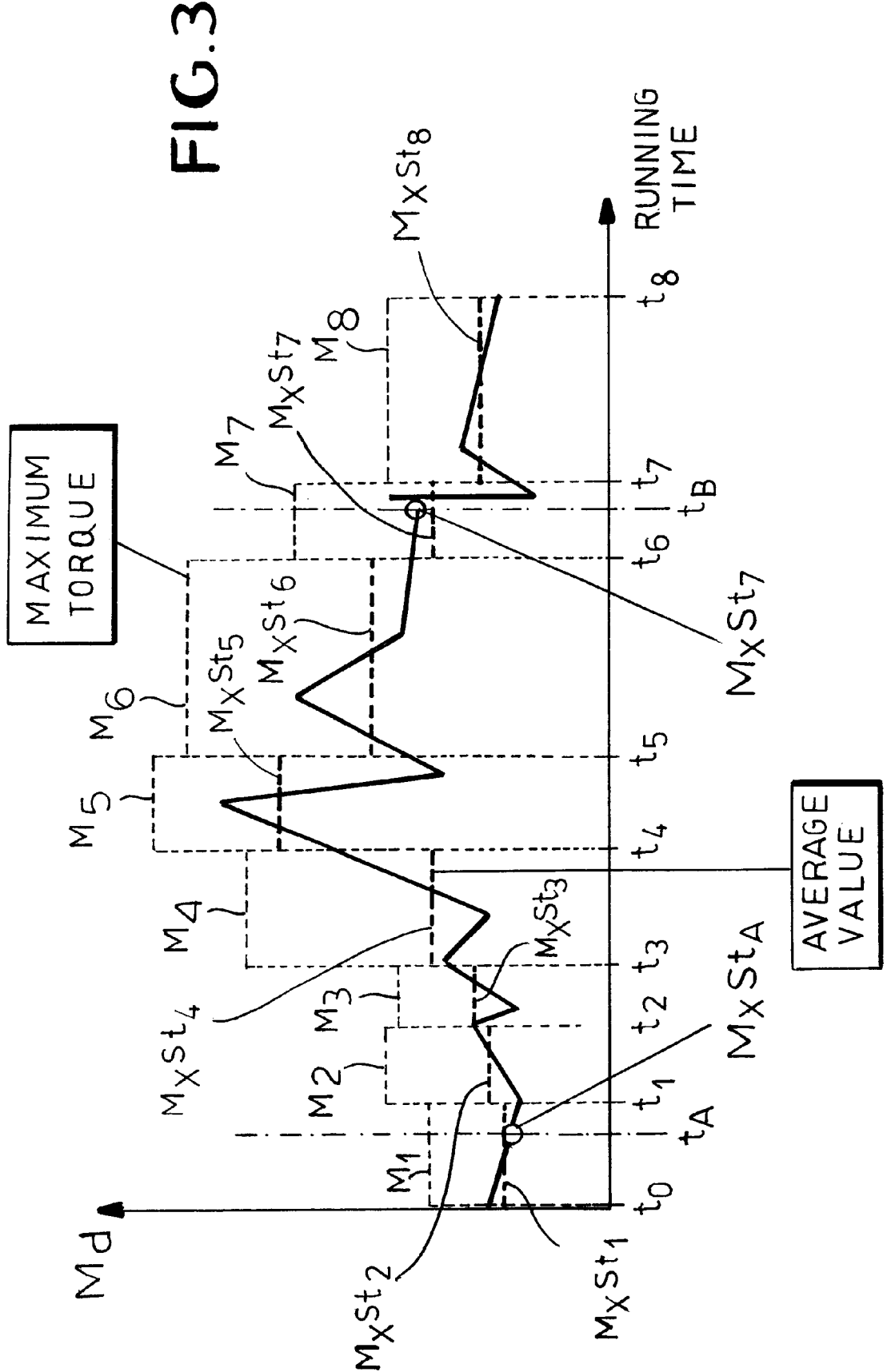
FIG. 3 is a graph of the relationship of the decomposition of switching sequence and thus the course of the torque at a tap changer into certain characteristic segments, i.e. so-called windows.

FIG. 3 shows schematically a method already known and especially advantageous from DE 197 46 574 C1 for the basic monitoring of a tap changer. In this graph the following time ranges are illustrated.

Time Nominal Torque Function
$t_0$–$t_1$ $M_1$ Maltese Roller Inlet (Geneva Engaged)
$t_1$–$t_2$ $M_2$ Fine Selection Interruption
$t_2$–$t_3$ $M_3$ Preselection Interruption
$t_3$–$t_4$ $M_4$ Fine Selector and Preselector Switchover
$t_4$–$t_5$ $M_5$ Preselector Switch On
$t_5$–$t_6$ $M_6$ Fine Selector Switch on and Maltese Roller Disengagement
$t_6$–$t_7$ $M_7$ Load Switchover Jump
$t_7$–$t_8$ $M_8$ Trailing Movement The torque course at the tap changer thus follows a function MSt=f(t) i.e. a time dependency with typical function and time ranges here divided into segments $t_0$–$t_1$, $t_1$–$t_2$, ..., $t_7$–$t_8$, representing so-called windows. The actual torque of each window, more precisely the average value of the course of the torque within this window or in another has a characteristic value which is represented by a certain calculated numerical value for this window and can be compared with a previously determined maximum permissible torque value constituting the respective setpoint. In the illustration in FIG. 3, the corresponding actual torque value has been indicated at Mx$_b$St1 ... $M_x$St8. The subscript index "x" indicates the respective step of the tap changer. In new installations, the subscript for the first step of the tap changer begins with "1" and so forth. The subsequent indicia "1" through "8" indicate the respective window which belong to this value. The thick dotted line in FIG. 3 represents the corresponding average value or an otherwise determined characteristic value of the actual torque. The thin dotted lines represent the permissible maximum values M1 ... M8 of the respective window at which, should they be exceeded, a warning, an alarm or an error or failure signal or the like is triggered.

Thus the switchover is effected successively in x=1, 2 ... until the end of the life of the tap switch always with the corresponding actual torque value MSt which, as already has been noted, is age and temperature dependent and thus in a variable relationship to the calculated torque MPw based upon the power requirement of the drive motor.

Figure 4:
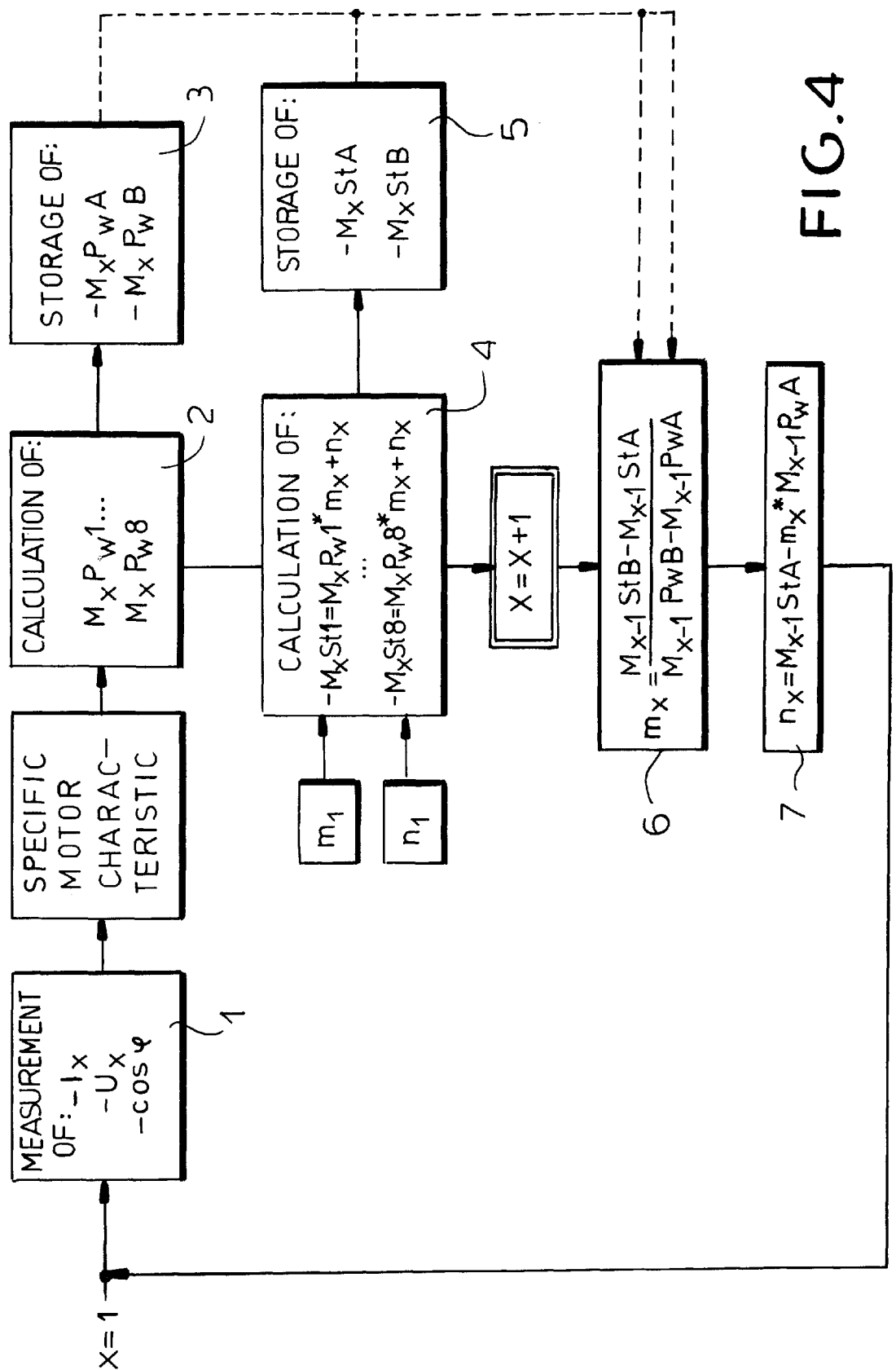
FIG. 4 is a part of a flow diagram of a first method according to the invention.

FIG. 4 shows schematically the most important part of a first method aspect of the invention.

Initially there is effected in a manner known per se, a measurement of the voltage Um, the current I and the phase angle cos φ at the drive motor during the actuation of the tap changer (Step 1). From these values with the aid of a known voltage motor characteristic line of the corresponding drive motor, the respective torque value $M_xPw1 \ldots M_xPw8$ is calculated for each of the steps 1 through 8 (Step 2). This subdivision already described above of the overall course of the torque into typical windows, i.e. segments which follow one another in time successively is here especially advantageous and will be described in greater detail. It is not however a necessary component of the method of the invention It is also possible, when higher costs are not a problem, to calculate substantially continuously values for the torque at the drive motor as the basis for a subsequent monitoring. A first time actuation of the tap changer following the installation of which the illustrated calculation begins with x=1, two characteristic values within the overall calculated course of the torque, i.e. within all of the windows which come into play during the switchover, are stored in volatile memory. In the example shown in FIG. 4, these values are the values $M_xPwA$ at the time point $t_A$ shortly before the fine selector actuation and the value $M_xPwB$ at the time point $t_B$ at force storer stressing. Other characteristic values can also be provided. What is important is only that the basic time points at which these characteristic values arise is chosen and as such detected while the overall process according to the invention remains unchanged. Which values in a concrete case are selected for the purpose depends finally upon the structural requirements for the apparatus used. The characteristic values chosen in the example which is explained here at the time point $t_B$ is somewhat advantageous because at this time point only the spring of the force storer of the tap changer is pulled up. The spring force of the force storer which substantially during the overall life remains unchanged, serves here as "normal". In the first time actuation which is here initially described of the tap changer with the condition x=1, there is also a volatile storage or the values $M_1PwA$ and $M_1PwB$ (Step 3) thereafter in the first switchover x=1 there is effected the calculation of the real time torque value at the tap changer according to the formula.

$$M_xSt1=M_xPw1 \cdot m_x+n_x \text{ etc. to } M_xSt8=M_xPw8 \cdot m_x+n_x \quad \text{(Step 4)}.$$

After the calculation of this value, the two characteristic values $M_xStA$ and $M_xStB$ (Step 5) are stored in volatile memory. These values are thus volatilely stored for always the same two points in time $t_A$ and $t_B$ in the switching sequence as well as the two torque values (Steps 3 and 5) which are directly calculated from the power as well as from the two values min. From the calculated actual torque value (Step 4), now compared as is known with the previously obtained maximum setpoint value, an indication of the function state of the tap changer is obtained. This comparison between actual value of the torque and setpoint value of the torque has not been shown in FIG. 4. The values $m_1$ and $n_1$ required for the calculation at the first time actuation at the tap changer are first obtained, i.e. predetermined for the process. With the first switching, therefore, there is not yet any correction of the transfer function.

With the next actuation of the tap changer the index is raised to x=2. There is effected an initial correction, i.e. the values $m_1$, $n_1$ which originate in the system and are not used for the transfer function but rather the new value $m_2$, $n_2$ are calculated. This is effected in accordance with the formula:

$$m_x = \frac{M_{x-1}StB - M_{x-1}StA}{M_{x-1}PwB - M_{x-1}PwA}$$

(Steps 6 and 7). These calculations are carried out with the aid of the characteristic values volatilely stored in Steps 3 and 5 for x=1, i.e. the preceding switchover. These can be used in steps 6 and 7 to newly calculate the values for m2 and m1 from the values of I, U, cos φ for the second switching of the tap changer to calculate $M_2Pw1 \ldots M_2Pw8$ from which the actual values $M_2St1 \ldots M_2St8$ are obtained with a corrected transfer function. These values can again be compared in each window with the maximum values $M1 \ldots M8$. Simultaneously in steps 3 and 5 the respective volatilely stored characteristic value overwrites the corresponding characteristic value from the preceding actuation i.e. in Step 3, the previously stored values $M_1PwA$ and $M_1PwB$ are overwritten by the values $M_2PwA$ and $M_2PwB$. In Step 5 the previously stored value $M_1StA$ and $M_1StB$ were overwritten by the values $M_2StA$ and $M_2StB$. These new but yet volatilely stored values remain during the next switchover of the tap changer i.e. for x=3 for the calculation of $m_3$ and $n_3$, for the calculation again of the new transfer function.

In summary, the described method determines at each switching of the tap changer on the basis of the characteristic data for the previous switching, which is volatilly stored, the transfer function anew. With this new transfer function the corrected actual torque value at the tap changer is calculated. Simultaneously, from this family of values corresponding new characteristic values are again stored which then with the next switching on their side serve to calculate further corrected transfer functions, etc.

Figure 5:
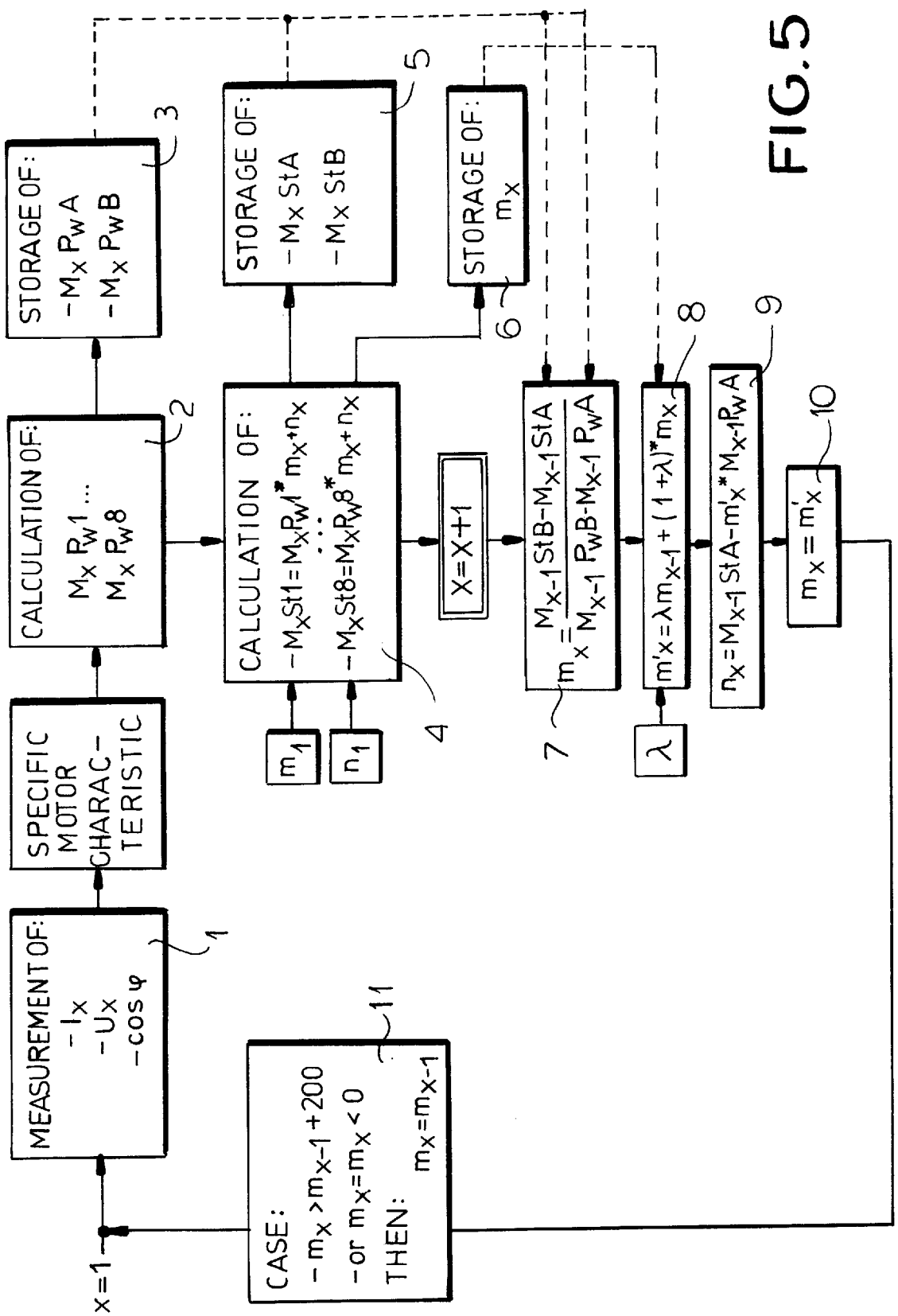
FIG. 5 is a part of a flow diagram of a second method.

In FIG. 5 the important parts of a second method aspect according to the invention has been graphically illustrated. The steps 1–5 described in conjunction with FIG. 4 operate also in this process unaltered. In addition, however, the correspondingly determined values $m_x$, i.e. the values of the respective slopes are also stored in volatile memory. As has been described with FIG. 4, in the first switching after having been set in operation, the corresponding value m1 is supplied to the system. With each subsequent next switching, which increases the index x by 1, i.e. with the second switching at x=2, in Step 7 the corresponding value for $m_x$ here thus $m_2$, is determined; this is effected in accordance with the same formula as has been given in FIG. 4 at step 6. What is different is that there is an additional subsequent step 8. In this step, beginning with the second switching of the tap changer, i.e. x=2, from each newly determined value $m_x$, thus for example $m_2$ an effective view $m'_{x-1}$ is determined utilizing the voltalilly stored previous value $m_{x-1}$, here, thus $m_1$, in accordance with the formula:

$$m'_x = \lambda \cdot m_{x-1} + (1-\lambda) \cdot m_x$$

λ is thus the so-called memory value, a value between 0 and 1, which indicates the portion of the preceding value $m_{x-1}$, here thus the previously volatilely stored value $m_1$, and the newly calculated value $m_x$, thus $m_2$, which will contribute to the effective value $m'_x$, thus $m'_2$. The value for λ is predetermined. It can for example amount to about 0.75. In subsequent step 10, finally, this effective value $m'_x$ is converted into the new value $m_x$ which is further used.

In this method, not only are the values from the last previous switchover utilized to determine the new values $m_x$ and $n_x$ for the transfer function but in addition, also the memory factor $\lambda$, which represents the history of the switchings and contributed to previous values for m, is considered. With advancing switching of the tap changer the effect of further set backs becomes increasingly less. This method enables minimization of error calculations and outliers by earlier torque adjustments. With both described processes, it is especially advantageous to introduce a plausibility factor for the respective newly calculated values $m_x$ and $n_x$ in addition, thereby preventing permanent falsification of the result by temporary errors or external influences.

Such a plausibility control is introduced in FIG. 5 as step 11. It can however also be utilized in the first process of the invention described in connection with FIG. 4. In step 11 in FIG. 5, two conditions are given in which no correction is effected, i.e. the previous value $m_{x-1}$ also gives the subsequent new value $m_x$. This is the case on the one hand when the newly calculated value differs by more than a limiting value from the previous value or when it gives a negative value which is not possible in accordance with the basis mathematical model. In these cases, no correction is undertaken and the error calculation is simply masked out. It is also possible to introduce this plausibility control step between the steps 7 and 8 in FIG. 5 so that no erroneous calculation of the memory-based value for $m'_x$ can result.

What is claimed is:

1. A method of monitoring a tap changer comprising the steps of:
   (a) during an actuation of a tap changer in a switchover process, substantially continuously measuring values of current, voltage and phase angle of an electric drive motor of a motor drive provided for actuating the tap changer;
   (b) calculating from said values an actual power draw of the drive motor;
   (c) determining from the power draw and a motor characteristic of the drive motor, an effective torque thereof by the steps of:
   ($c_1$) with each switchover process (x=1,2,3, . . . ) of the tap changer from values for a torque at the drive motor ($M_xPw1$ . . . $M_xPw8$) selecting characteristic values ($M_x$ PwA, $M_x$ PwB) of motor torque at two previously established time points ($t_A$, $t_B$) which are the same for each switchover process and stored,
   ($c_2$) calculating from magnitudes of the characteristic values of motor torque at the drive motor ($M_xPw1$ . . . $M_xPw8$) the calculated values for torque at the tap changer ($M_xSt1$ . . . $M_xSt8$) in accordance with the relationship $$M_xSt1=M_xPw1 \cdot m_x 30\; n_x, \ldots, M_xSt8=M_xPw8 \cdot m_x+n_x,$$

and monitoring said calculated values and comparing said calculated values with previously established threshold values, whereby the values for $m_x$ and $n_x$ are calculated for a torque at the drive motor ($M_{x-1}PwA, M_{x-1}PwB$) and at the tap changer ($M_{x-1}StA, M_{x-1}StB$), each at the respective one of the two time points ($t_A, t_B$) according to the relationships $$M_{x-1}StB - M_{x-1}StA$$

$$M_{x-1}PwB - M_{x-1}PwA$$

and $$n_x = M_{x-1}StA - m_x \cdot M_{x-1}PwA,$$

and
   ($c_3$) selecting and storing from the magnitudes of these calculated values for the torque at the tap changer ($M_xSt1$ . . . $M_x$ St8) the characteristic values at two previously established time points ($t_A, t_B$) for the torque at the tap changer ($M_x$ StA, $M_x$ StB).

2. The method according to claim 1 wherein after each switchover process, characteristic values in storage for a previous switching (x−1) for the torque at the drive motor ($M_{x-1}PwA, M_{x-1}PwB$) and at the tap changer $M_{x-1}StA, M_{x-1}StB$) are overwritten by corresponding values of an immediately concluded subsequent switchover process.

3. The method according to claim 1 wherein prior to a first-time switch operation (x=1) in an unactuated new state of the tap changer or after a resetting thereof, values for $m_1$ and $n_1$ are predetermined from an external source.

4. The method according to claim 1 wherein, for calculation of $m_x$ an additional memory factor $\lambda$ is used which is less than 1 and from which a corrected value $m_{1x}$ is obtained in accordance with the relationship $m'_x = \lambda m_{x-1} + (1-\lambda)m_x$.

5. A method according to claim 1 wherein each calculation of $m_x$ is compared with a value $m_{x-1}$ obtained and stored in a preceding switchover operation and when $m_x<0$ or $m_x>m_{x-1}+a$, where a is predetermined constant, than $m_x=m_{x-1}$.

6. The method according to claim 1 wherein the values for the torque at the motor ($M_xPw1$ . . . $M_xPW8$) and at the tap changer ($M_xSt1$ . . . $M_xSt8$) are subdivided into windows, and for each window a single value for the corresponding torque is calculated.

* * * * *